Patented July 20, 1943

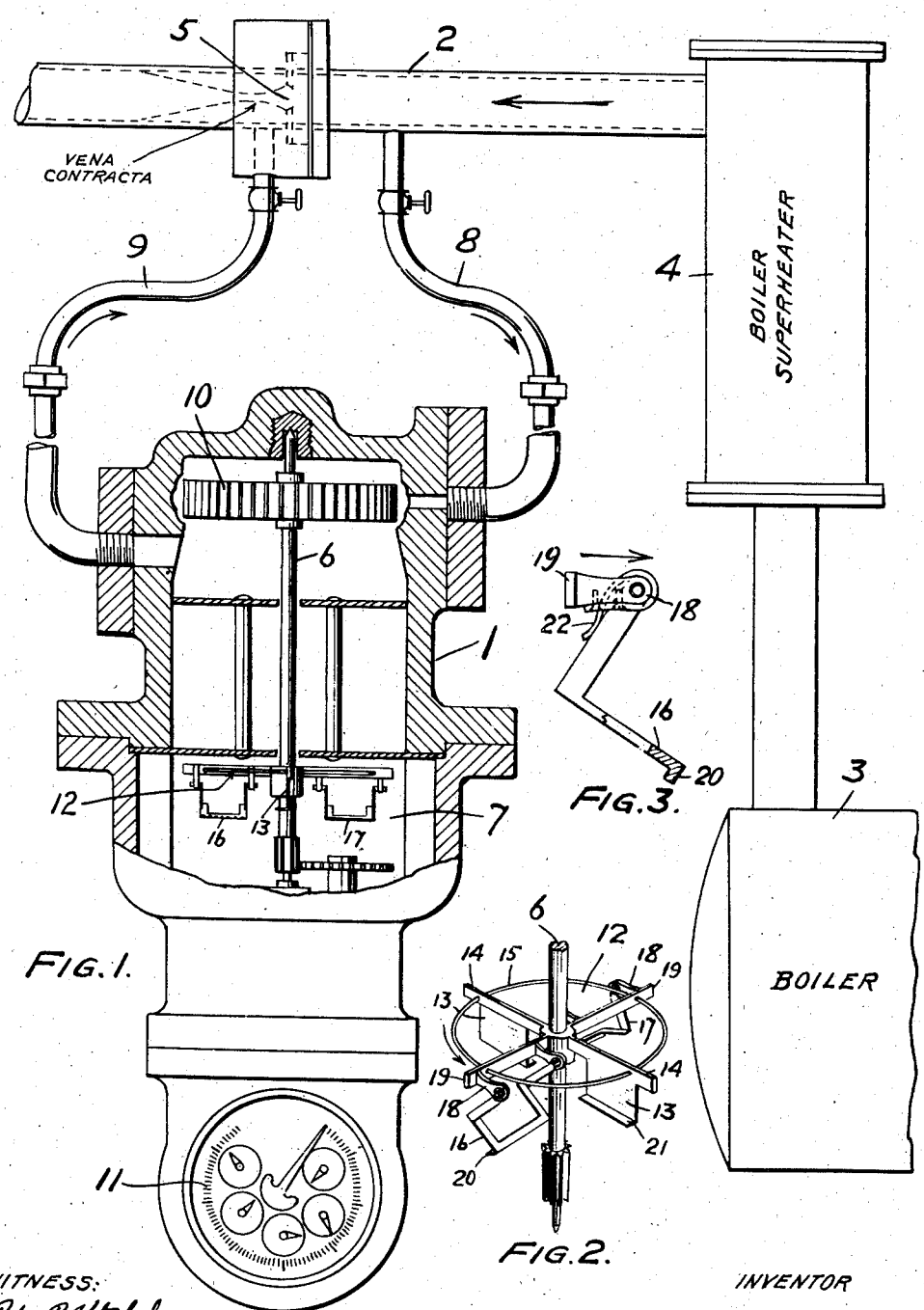

2,324,606

UNITED STATES PATENT OFFICE 2,324,606

FLOWMETER

Walter C. Wagner, Ardmore, Pa.

Application November 23, 1940, Serial No. 366,808

3 Claims. (Cl. 73—230)

This invention relates to flow meters and, more particularly, to rotating element flow meters.

The purpose of this invention is to obtain an accurate measurement of fluid flow or rate of flow by introducing automatic compensation in rotating element flow meters particularly at lower rates of flow and also particularly under conditions where the flow meter is subjected to changes in position, such as occur when measuring steam flow on ships when in motion. Included in the above are both the use of the self-contained meter through which all of the fluid to be measured flows and a proportional flow meter through which a proportional part of the fluid flows.

Heretofore, when rotor type flow meters have been used for measuring proportional flow, it has been the practice to pass a part of the fluid to be measured through the meter and the remainder through a parallel-connected channel which would develop sufficient friction head to give rise to a pressure differential sufficient to operate the meter over the desired operating range. This method of proportional flow measurement produced an unrecoverable pressure drop or loss of head. In my improved apparatus I have found it possible to obtain accurate measurement of fluid flow without such appreciable loss of head by operating my rotor type flow meter from the virtual pressure differential developed between the mouth or inlet and the vena contracta of a differential producing device such as an orifice or Venturi tube. In this case, the pressure is largely recovered down stream where the fluid again fills the pipe and again flows at the lower velocity existing before reaching the differential pressure-producing device.

In my self-contained meter, automatic compensation is introduced to care for the light-rates-of-flow inaccuracies inherent in available designs and in my proportional flow meter additional compensation is introduced to care for the low-rates-of-flow inaccuracies inherent in both the meter itself and in the differential producing device such as an orifice plate in a pipe.

The use of my rotating type meter results for the first time in high accuracy measurements substantially over the entire range of flow measurement. In addition, the use of my meter results in greater certainty of maintained metering accuracies particularly over the lighter load range, which condition is not obtainable in differential type flow meters through which the fluid flow does not pass. Whereas, heretofore, the percentage registrations of fluid flow meters at various rates of flow have been cited in terms of full-load rating, the percentage registration of my meter, because of its greater accuracy may be expressed in terms of the actual rate of flow at the time of test.

A further object of the invention is to improve the accuracy of flow meters used to accomplish the objects stated and also for other like purposes.

Another object of the invention is to accurately meter the rate of flow or quantity of fluid such as steam flowing through a pipe to supply the demand required by equipment employed on a moving ship, more especially a sea-going vessel subject to great movement.

Still another object of the invention is to correct the error common to fluid flow metering orifices, nozzles, or other differential producing apparatus, and therefore to flow meters dependent upon them, which occurs because at lower rates of flow they inherently fail to produce a differential commensurate with the rate of flow.

Other objects of the invention will appear from the following description.

The present invention, generally stated, consists in a full flow or a proportional flow meter having a rotor driven by the velocity and expansion of the fluid and a form of paddle-wheel brake or damper of which some of the paddles are pivotally suspended and have their drag surfaces disposed more or less edgewise in the direction of motion of the rotor to permit relatively slight fluid-resistance at lower rates of flow, and which, by swinging, shaft the drag surface into a position more transverse to the direction of motion of the wheel to increase the fluid-resistance at higher rates of flow and high rotational speed of the meter, whereby the registration is relatively increased at low rates of flow. When the meter is used to measure proportional flow, the compensation for low rates of flow is increased to take care of the additional low-rate-of-flow errors introduced by the orifice plate or other differential producing device.

In the following description, reference will be made to the accompanying drawing forming part hereof and in which:

Fig. 1 is a side view (with parts removed) of a flow or fluid meter embodying features of the invention and also showing the application of the meter to the measurement of steam;

Fig. 2 is a perspective view of pendent parts carried by the rotor of the meter and embodying features of the invention;

Fig. 3 is an edge view partly in section of a modification of the self-adjusting vanes of my invention; and Fig. 4 is a plan view of another modification of the self-adjusting vanes of my invention.

Referring to the drawing, I indicates a flow or fluid meter. 2 indicates, for example, a steam-supply pipe which may lead from a steam generating boiler 3 through a superheater 4 to a source of steam consumption such as a steam turbine (not shown because too well-understood to require illustration). 5 designates a differential-producing device of the type producing a vena contracta, such as an orifice plate, interposed in the steam pipe 2. Within the meter there is the usual rotor 6 and there is provided space as at 7 for a volume of water or other fluid. The meter is shown in a bypass connection 8 and 9 on opposite sides of the orifice 5 and it is the flow through the bypass which drives the rotor, for example by means of the rotor wheel 10, in the direction of the arrow shown in Fig. 2. The conduit 8 is connected to the upstream side of the orifice 5 and the conduit 9 at the vena contracta of the orifice. The rotor in turn actuates the registering mechanism 11.

The meter is provided with a paddle-wheel brake or damper 12 having fixed paddles or vanes 13 arranged in the pool at 7 flatwise in the direction of motion of the paddle-wheel and immovably connected with the rotor 6. The paddle-wheel is provided with fixed radial arms or spokes 14 shown as connected by a ring 15.

The damping effect of fixed vanes, such as these paddles 13, as is well-known, corrects for the tendency to run too fast at relatively high rates of flow and high speeds and results in good accuracy of the meter at such loads and speeds, but the meter tends to register too low at relatively low rates of flow and slow speeds.

By my invention, accuracy of the meter is obtained at relatively light loads or at low speeds without interfering with accuracy at heavy loads or at high speeds by means of self-adjusting dampers such as the vanes or paddles 16 and 17. These vanes are pivoted and suspended from brackets 18 secured to arms 19 similar to the arms 14. The vanes 16 and 17 are alike so that a description of one of them will suffice. The paddle or vane 16 has the center portion of its drag surface cut away to the extent required for the desired correction so that it is in the general form of a loop or stirrup. The lower edge or margin of the vane 16 is provided with a narrow web or lip 20 extending backwardly from the direction of movement for the purpose of giving proper direction to the flow of fluid past the vane. The arms by which vane 16 is pivoted to bracket 18 may, if desired, limit the pivotal movement of the vane but, as there is no tendency for the vane 16 to rise after its face is at right angles to the direction of rotation of the rotor, such stops are generally unnecessary. Similarly the flow past each of the vanes 13 is guided by a similar lip 21.

Normally, the movable vanes 16 and 17, when the rotor is at rest or is moving relatively slowly, hang down and present their drag surfaces more or less edgewise in the direction of rotation. They therefore exert a minimum of damping effect on the meter at relatively light rates of flow or low speeds but, with increasingly higher speeds or heavier loads, they are swung back by the increased pressure of the damping fluid, thereby presenting more of their drag surfaces normal to the direction of their motion, thus increasing the damping effect, with consequent maintenance of uniform meter accuracy over the load range. For each speed of rotation of the motor 6, therefore, the vanes 16 and 17 take up a fixed position. The drag surfaces of vanes 16 and 17 are so shaped and proportioned in relation to the fixed vanes or paddles 13 that uniform accuracy is obtained over the complete range of loads or speeds.

In Fig. 3 I have illustrated the vane 16 as acting against a spring 22 secured to the bracket 18 instead of being positioned in equilibrium between the pressure of the fluid and the force of gravity. This construction permits the use of the meter at quite large departure from level without loss of accuracy.

Although I have illustrated and described a construction showing the damper 12 as having two fixed and two variable vanes, it should be understood that any or all of the vanes can be of the automatically adjustable type, and the number of vanes can be varied from a single adjustable vane to as many vanes as desired, proportioned between fixed and variable vanes in any ratio. It is also to be understood that in place of the stirrup shape, the adjustable vanes may have any shape consistent with the principle of providing less drag effect at low speeds.

When the meter is used as a proportional flow meter, that is, when part of the total flow is through an orifice plate or other differential-producing device and a proportional part through the meter, the errors of both the flow meter and of the differential-producing device at low rates of flow can be compensated for by suitably proportioning the fixed vanes and/or the automatically adjustable vanes. The meter 1 is shown connected for proportional flow through the supply pipe 2. It is obvious, however, that when connected directly in the pipe line the meter will measure total flow. For example, the meter 1 measures the total flow in the bypass connection 8 and 9.

Because meters hitherto available do not provide satisfactory accuracy over their lower ranges of capacity, it has been the practice to operate two or more such meters of differing ranges for satisfactorily metering the different rates of flow in a single pipe, the meter or meters of lower range being rendered inoperative automatically or manually when the flow of fluid exceeded a predetermined rate, and vice versa. The need for this practice is obviated by the use of my meter because it is uniformly accurate over the entire operating range of fluid flow. In other words, my meter can replace, without sacrifice of metering accuracy, groups of two or more meters of different sensitivities now in use to obtain accurate metering over wide ranges of fluid flow, with a consequent simplification and economy of equipment and operating expense.

It will be obvious to those skilled in the art that modifications may be made in details of construction and in matters of mere form without departing from the spirit of the invention.

I claim:

1. In a fluid meter, a rotor equipped with a radial member, a generally U-shaped paddle element having its arms pivoted to said member and having a marginal web disposed crosswise of the paddle element.

2. In a flow meter, a rotor equipped with radial spokes, and vanes of which some are imperforate and are immovably attached to the spokes and of which others are pivotally suspended from the spokes and are perforated and provided with marginally-projecting webs.

3. In a fluid meter, a rotor equipped with a radial member, and a generally U-shaped paddle element having its arms pivoted to said radial member so that said element is free to rotate about an axis extending radially from the axis of rotation of said rotor.

WALTER C. WAGNER.